United States Patent Office 2,974,979
Patented Mar. 14, 1961

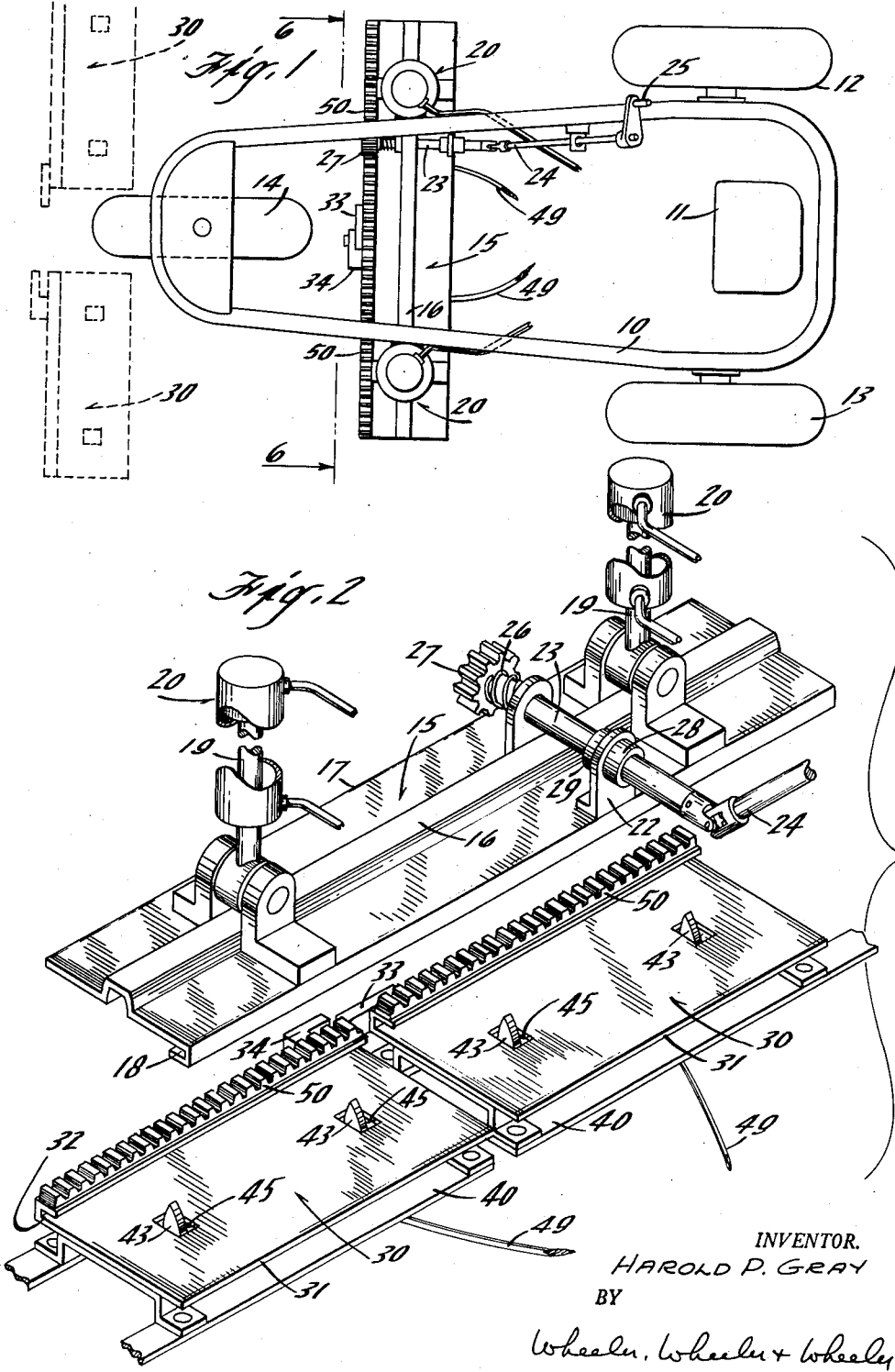
March 14, 1961     H. P. GRAY     2,974,979
TRACTOR HITCH
Filed Sept. 23, 1957     2 Sheets-Sheet 1
INVENTOR.
HAROLD P. GRAY
BY
Wheeler, Wheeler & Wheeler
ATTORNEYS

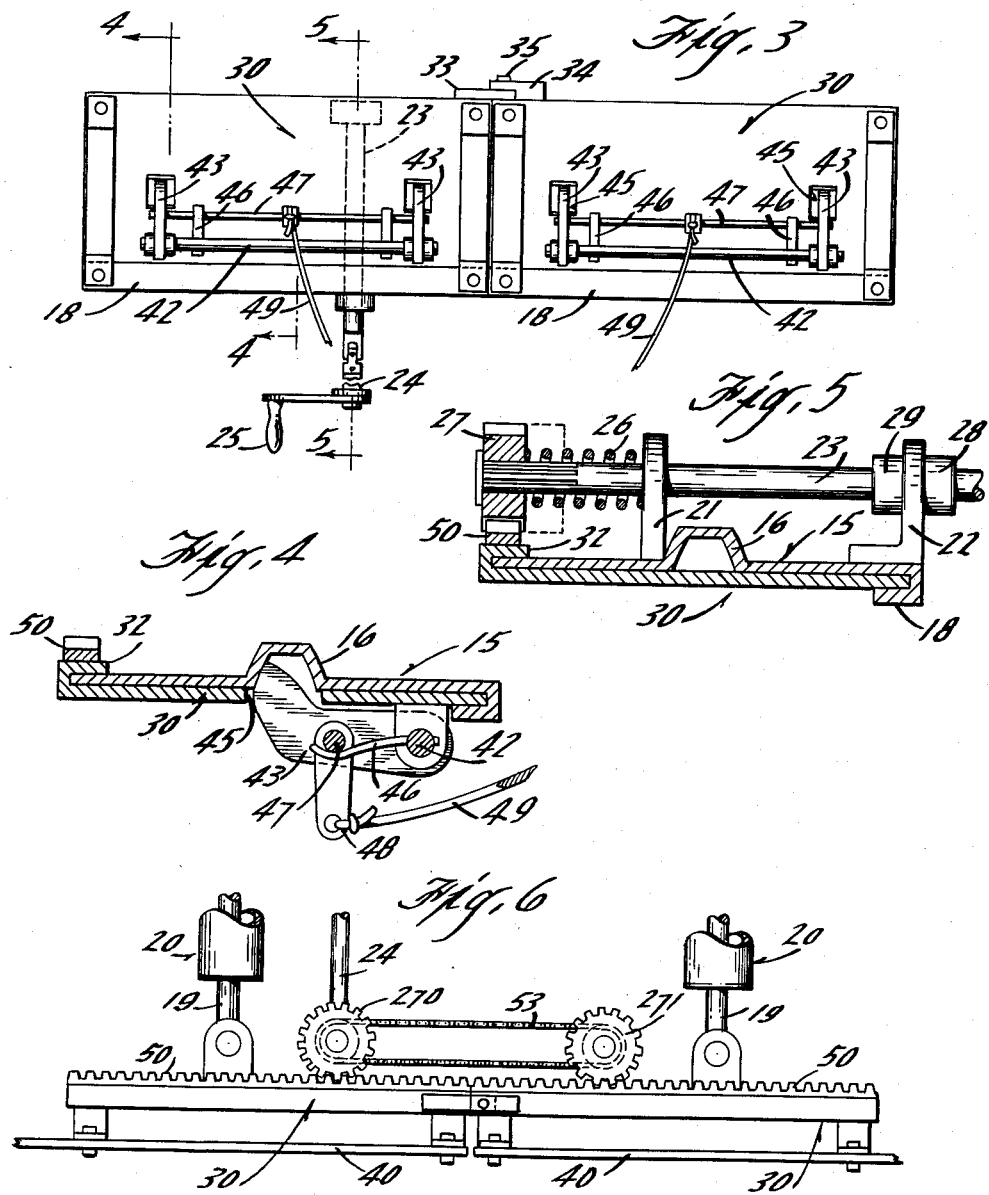

2,974,979
TRACTOR HITCH
Harold P. Gray, 522 3rd St., Traverse City, Mich.
Filed Sept. 23, 1957, Ser. No. 685,721
9 Claims. (Cl. 280—469)

This invention relates to a tractor hitch.

It is the object of the invention to facilitate hitching and unhitching implements without requiring the operator to leave his seat on the tractor for either operation.

While it is broadly immaterial where the hitch is used, the preferred arrangement is to dispose the hitch between the front and rear wheels of the tractor. It comprises two separable plates. The one connected with the tractor has a free forward margin and a forwardly opening channel beneath its rear margin. The plate attached to the implement has a rearwardly opening channel above the forward margin adapted to receive the free forward margin of the upper plate and it has a free rear margin adapted to be received into the forwardly opening channel of the upper plate. Thus, the plates are readily engageable by a relative forward movement of the tractor respecting the implement and are readily disengageable by relative rearward movement. There may be more than one of the lower plates connected with separate implements and they may be attached to each other for movement in unison longitudinally of the upper plate, means such as a pinion on the upper plate and a rack on the lower plate being provided to effect such movement.

The relative movement of the implement-carried plate or plates makes it unnecessary to register the tractor accurately with the implement at the time of hitching, since the position of the implement is readily adjustable laterally after the hitching is complete. Moreover, the preferred embodiment herein disclosed includes latch elements connected with one of the plates and engageable with the other to preclude relative movement between the plates in a releasing direction, thus assuring that the connection between the tractor and the implements will be permanent unless and until release is desired.

In the drawings:

Fig. 1 is a plan view of a tractor equipped with a hitch embodying the invention. The tractor illustrated is a three-wheel tractor such as is disclosed in a companion application, Serial No. 685,738, filed September 23, 1957, now Patent 2,942,677.

Fig. 2 is an enlarged view in perspective showing in relatively separated positions component parts of a hitch embodying the invention.

Fig. 3 is an inverted plan view of the implement-carrying plates in mutual connection.

Fig. 4 is a view on an enlarged scale taken in section on line 4—4 of Fig. 3.

Fig. 5 is a view on an enlarged scale taken in section on the line 5—5 of Fig. 3.

Fig. 6 is a view of the implement-mounted plates taken in front elevation from the viewpoint indicated by the line 6—6 in Fig. 1.

The tractor 10 happens to be provided with three wheels. The seat 11 is located between the rear wheels 12 and 13. The single front wheel 14 is for steering. Details as to the drive and steering are not illustrated, being shown in the companion application above identified.

The preferred organization of the present invention includes a tractor-mounted upper hitch plate 15 which is separately illustrated in perspective in Fig. 2. Extending longitudinally of the plate 15 (transversely of the tractor) is an inverted downwardly opening channel 16, the sides of which constitute shoulders engaged by a locking pawl on the lower plate hereinafter to be described. The forward margin 17 of the plate 15 is free and receivable in a complementary channel of the lower plate hereinafter to be described. Along the rear margin of plate 15 extends a flange which provides a forwardly opening channel 18 complementary to the free rear margin of the lower plate hereinafter to be described.

Hitch member 15 may be mounted on the tractor in any desired manner. As shown, the mounting includes pistons 19 of hydraulic ram 20, the pistons being in pivotal connection with plate 15 upon axes parallel to the longitudinal axis of the tractor.

The columns 21, 22 on plate 15 provide bearing supports for a shaft 23 in which there is a universally jointed section 24 for operation by a handle 25. At its forward end, the shaft carries a pinion 27 spaced above plate 15 and yieldable on the shaft against the bias of a compression spring 26 which seats against the column 21. The shaft itself is locked against yielding movement by collars 28 and 29 which engage opposite sides of the bearing support 22.

The complementary bottom plate 30 has a free rear margin 31 complementary to and engageable in the channel 18 and it has at its forward margin a flange providing a rearwardly opening channel at 32 complementary to and adapted to receive the free forward margin 17 of plate 15. In the device as shown, the upper plate 15 is elongated to receive connection with two separate implement-connected plates 30, each of which is relatively short. These plates are duplicates of each other except for the fact that they have complementary link and pocket forming members 33 and 34, respectively, these being detachably connected by a bolt 35, the arrangement enabling actuation of the plates separately or concurrently as desired. Connected to each of the plates in a position spaced therebeneath is an implement 40. The implement is only fragmentarily illustrated in Figs. 2 and 6.

Mounted beneath each of the implement-attached plates 30 is a pintle shaft 42 supporting the locking dogs or pawls 43 which, as best shown in Fig. 4, are normally projected through the openings 45 of the lower plate 30 into the channel 16 of the upper plate 15, being subject to the bias of the springs 46. A rod 47 connects the two pawls and requires them to operate in unison and an arm 48 connected with rod 47 provides anchorage for the line 49 which may be pulled by the operator to draw the dogs 43 out of the channel 16 to release plate 30 from plate 15 to permit relative movement of the tractor-carried plate 15 in a rearward direction or to the right as viewed in Fig. 4 to disengage the tractor from the implement-connected plate 30. When the tractor is moved forwardly and the plate 15 is adjusted by ram 20 downwardly to a level for contacting plate 30, the movement of plate 15 over the pawls 43 will depress the pawls 43 until the plates are fully engaged, whereupon the pawls will spring up into the channel 16 to lock the parts in engagement against release by any relative movement of the tractor until the pawls are disengaged by the operator's manipulation of the line 49.

While the lock operation as described positively secures the plates against disengagement or relative movement in a forward or rearward direction, the plates are nevertheless freely movable longitudinally, that is to say, in a direction transverse with respect to the longitudinal center line of the tractor. Relative longitudinal movement of the plates is controlled by mesh of the pinion 27 with the racks 50 with which the implement-connected plates 30 are provided, preferably along the upper margins of their forwardly located channels 32. These racks are so designed that when the respective plates are in end-to-end abutment as shown in Fig. 6, the pinion 27 will operate from end-to-end of the implement-connected plates so that the respective implements attached to such plates will be moved in unison laterally of the tractor. Because the off-center location of the pinion shown in Fig. 2 would permit the implements to be extended laterally in one direction more than another, I may use the alternative arrangement of Fig. 6 in which the pinion 270 is connected by chain 53 to a similar pinion 271, each pinion meshing with one of the racks 50 and the arrangement permitting the unitarily connected plates 30 to be moved to the full extent accommodated by either of the pinions.

The interlocked flanges of the upper and lower plates 15 and 30 not only accommodate this relative transverse movement of the plates 30 and the implements connected thereto but also provide means whereby the plates are locked against relative vertical separation. This enables the rams 20 to be used to lift not only the plate 15 but also to lift the implement or implements connected to the plate or plates 30. Thus, the implements may be lifted free of the ground for transportation from one place of use to another; they may be loaded with some of the weight of the tractor during use; and they may be lifted free of the ground when it is desired to effect a relative lateral movement between the implement and the tractor by manipulation of the pinion 27 or the jointly operated pinions 270, 271.

In the past, it has been necessary for the operator of a tractor to manipulate his tractor with considerable care in order to get it to the precise point at which an implement can be coupled to the tractor. He not only was obliged to have the correct tractor position in a forward and rearward direction, but he was obliged to have the tractor properly lined up with the implement in a lateral direction. It will be apparent to those skilled in the art that the present hitch permits a wide latitude of relative location of the tractor and hitch in a lateral direction, since it is only necessary that the upper and lower plates be coupled somewhere within a range in which pinion 27 will be engaged with some part of the rack. So far as the direction forwardly and rearwardly is concerned, all that is necessary is that the plate 15 be at the rear of flange 32 of the plate 30 when relative movement between the two plates is initiated. Movement of the tractor-attached plate 15 either forwardly or in a downward direction will, in either case, displace the pawls 43 to permit interengaging movement between the plates. A forward movement of the tractor will then effect engagement even while the tractor remains in motion. The desired relative lateral position of the implement-attached plate or plates 30 can be adjusted thereafter.

Release is equally simple. All that is required is to manipulate the line or lines 49 to disengage the locking dogs or pawls 43, whereupon a slight rearward movement of the tractor will disengage the plates and the tractor-attached plate 15 is then lifted and the tractor backed out from between plates 30. It will, of course, be understood that the plates 30 will have been separated for this purpose by disconnection of the members 33 and 34 and manipulation of the pinion 27 which meshes with the racks 50. The advantage of using two separate implements and implement-connected plates is that these may be disposed at opposite sides of the path of the single front wheel 14 of the tractor as shown in dotted lines in Fig. 1. However, single implement-connected plates may also be used since, regardless of the length of this plate, it can always be engaged at one end of its rack with the pinion 27, and thereafter moved by manipulation of the pinion to the desired position respecting the tractor.

I claim:

1. A tractor implement hitch comprising a tractor-connected plate and an implement-connected plate in a superimposed relation and interlocking means for detachably connecting the respective plates, said means comprising channels carried by the respective plates on opposite margins and opening in opposite directions and providing ways in which bearing portions at the other margins of the respective plates are slidably engaged, whereby said plates are separable in a direction of relative movement in which the plates are freed laterally from respective channels, together with means including a pinion and rack teeth for adjusting one of said plates along said ways with respect to the other of said plates, said rack teeth being generally parallel to said direction of relative plate movement, whereby said pinion will slide to and from mesh with said rack teeth in the engagement and separation of said plates.

2. A tractor-implement hitch comprising a tractor-connected plate, an implement-connected plate, and interlocking means extending along the margins of one plate and engaged with marginal portions of the other plate for detachably connecting the respective plates, said means comprising channels carried by the respective plates on opposite margins and opening in opposite directions and providing ways in which bearing portions at the other margins of the respective plates are slidably engaged, together with releasable pawl means mounted on one of said plates, the other plate having a longitudinal channel in which said pawl means is releasably engaged, the pawl means opposing separation of the bearing portions of the respective plates from the channels aforesaid while accommodating relative movement of the plates along the channels.

3. A tractor-implement hitch comprising a tractor-connected member, an implement-connected member, the said members being vertically registrable and having at opposite forward and rearward margins complementary channels and bearing portions interlockingly engaged in one relative direction of forward-rearward movement between said members and disengageable in an opposite relative direction of such movement, one of said members being provided with a channel disposed transversely respecting the said directions of movement and the other being provided with pawl means releasably engaged in the channel and opposing relative movement between the members in a disengaging direction while accommodating relative movement between the members transverse to said direction, and means for effecting such transverse relative movement between the members.

4. The device of claim 3 in which said means comprises a rack with which one of said members is provided and which extends transversely respecting said relative direction of forward and rearward movement, and a pinion with which the other member is provided and which meshes with the rack and is operative to effect relative movement between said members transversely to said forward and rearward direction of engaging and disengaging movement.

5. In a tractor-implement hitch, the combination with a tractor-connected member and an implement-connected member, of ram means mounting the tractor-connected member for vertical adjustment, ways connecting said members for transmission of said vertical adjustment to the implement-connected member, while accommodating lateral displacement between said members, and means for effecting lateral movement of one of said members along said ways with respect to the other, said ways opening in opposite directions longitudinally of the path of tractor movement and the said members having bearing portions engageable in said ways in one direction of movement on said path and being disengageable from said ways upon movement in the opposite direction along said path, one of said members having releasable means for locking the other member against relative movement in a disengaging direction while accommodating relative lateral movement of said members in the direction of said ways.

6. The device of claim 5 in which one of said members is provided with a rack extending along and mounted upon its said way and the other member has a pinion connected with said rack and disengageable therefrom when said members have relative movement in a direction to disengage them from the conplementary ways of the other member.

7. The device of claim 6 in which the pinion has a shaft upon which it is yieldably mounted whereby to accommodate relative movement between it and the rack in the event of its failure to mesh with the rack when the members are moved relatively to each other in a direction to engage the respective ways of the other member.

8. A tractor implement hitch comprising a tractor-connected part and an implement-connected part, relatively movable in the direction of draft for engagement and disengagement, means for providing quickly detachable connection between the said parts when they are engaged for transmitting draft from the first mentioned part to the second mentioned part, said means including mechanism guiding said parts for relative movement in a direction transverse to the direction of draft, and means including driving means on one of said parts and driven means on the other for effecting such relative transverse movement whereby to displace the implement-connected part laterally with respect to the tractor-connected part while maintaining the draft connection between said parts, said means being engageable and disengageable in the relative movement of said parts in the direction of draft.

9. A tractor implement hitch comprising a tractor-connected plate and an implement-connected plate in superimposed relation, said plates having complementary margins respectively channeled and unchanneled, the channeled margins opening in opposite directions and constituting ways with which respectively the unchanneled margins of the respective plates are engaged, means for releasably retaining said plates, each with its unchanneled margin engaged in the channeled margins of the other plate, the plates being separable in a forward and rearward direction upon release of said retaining means, gear means mounted on one of said plates, the other plate being provided with teeth with which said gear means meshes for adjusting said plates along said ways while secured by said retaining means.

References Cited in the file of this patent

UNITED STATES PATENTS

| | | |
|---|---|---|
| 1,341,170 | Hall | May 25, 1920 |
| 1,417,112 | Shockey | May 23, 1922 |
| 2,590,537 | Holmes | Mar. 25, 1952 |